United States Patent [19]

Jeffers

[11] Patent Number: 4,644,173
[45] Date of Patent: Feb. 17, 1987

[54] FLAME QUALITY ANALYZER WITH FIBER OPTIC ARRAY

[75] Inventor: Larry A. Jeffers, Alliance, Ohio

[73] Assignee: The Babcock & Wilcox Company, New Orleans, La.

[21] Appl. No.: 629,159

[22] Filed: Jul. 9, 1984

[51] Int. Cl.$^4$ ............................ G06K 7/10; H01J 5/16
[52] U.S. Cl. .................................... 250/554; 250/227
[58] Field of Search ............... 250/554, 227; 356/315, 356/417; 340/578

[56] References Cited

U.S. PATENT DOCUMENTS 4,167,334  9/1979  Phillips ................................ 356/417
4,541,718  9/1985  Osada et al. ........................ 356/417

Primary Examiner—David C. Nelms
Assistant Examiner—Stephone Allen
Attorney, Agent, or Firm—Vytas R. Matas; Robert J. Edwards

[57] ABSTRACT

A flame analyzer for analyzing one or more qualities of a flame from a burner, comprises a fiber optic array including a plurality of optic fibers each having a light-receiving end lying in a line and facing the flame. The line extends parallel to the flame and burner axis or may extend perpendicular to that axis. The light received by the fiber optic array is provided as a sheet of light to a monochromator which spreads the light into its component wave lengths. A pair of spaced apart arrays of light detectors is then utilized to measure the light at two discrete wave lengths. The detection produces signals that can be analyzed to generate temperature and particles distribution values for the flame across its length or width.

15 Claims, 6 Drawing Figures

FLAME QUALITY ANALYZER WITH FIBER OPTIC ARRAY

FIELD AND BACKGROUND OF THE INVENTION

The present invention relates, in general, to flame-monitoring equipment, and, in particular, to a new and useful flame quality analyzer which utilizes a fiber optic array extending across a flame to be monitored, in conjunction with a a monochromator and detector array to produce signals which can be processed to display characteristics of the flame.

The operator of a multiburner furnace gets very little information concerning the status of the combustion inside the furnace. Each burner is usually provided with a flame detector to tell whether or not the flame is burning. Even this rudimentary information is difficult and expensive to get in many cases. Individual burners are also provided with a visual observation part. These, however, are severely limited in field-of-view and require the presence of an observer at the burner. Perhaps the best information is available through side doors which provide a wide-angle view of the burners adjacent the walls. Again, an observer is required at the door so routine use of the doors is limited. However, this is the primary source of information used by the startup engineer to set the burner for "optimum combustion". An obvious limitation is that only the burners near the wall are subject to observation.

Feeling the need for more information from the furnace interior, many furnace operators have installed TV cameras that view the flames from above. During startup and at low loads these systems are helpful, although plagued with maintenance problems. However, at normal loads the space between the cameras and the burners is usually filled with hot radiating particles that prevent any meaningful imaging.

There is a need for a device that tells the operator how well each of the individual burners in the furnace is performing. Such a device, in addition to providing a reliable flame on/off indication, would allow the operator to achieve higher system efficiency by identifying and adjusting poorly performing burners.

Previous attempts to meet this need have not been successful. Land Instruments in England and Environmental Data Corporation in the U.S. have offered devices for the purpose of burner performance monitoring and control. These devices provide an analog output which is used to "optimize" the combustion. Unfortunately, the output of these oversimplified devices does not correlate well with other measurements of flame quality under many conditions.

SUMMARY OF THE INVENTION

The present invention is drawn to an analyzer arrangement and method for measuring characteristics of a flame. The characteristics are displayed as a graphic representation which can be used by an operator not only to determine whether a flame is on or off, but also the quality of the flame and, thus, the effectiveness of the burner generating the flame.

Accordingly, an object of the present invention is to provide a flame quality analyzer for analyzing the quality of a flame generated by a burner, comprising, an imaging objective assembly and a fiber optic array including a plurality of optic fibers each having a light-receiving end for facing the flame of the burner, the light-receiving ends lying on a line in a selected direction with respect to an axis of the burner, and light-processing means connected to the fiber-optic array for processing light from the light-receiving ends.

A further object of the invention is to utilize a monochromator in conjunction with a detector having a pair of spaced-apart light-sensor arrays, as the light processing means, for generating a set of electrical signals that can be utilized to produce a display which is characteristic of one or more qualities of the flame.

Another object of the invention is to provide a flame quality analyzer wherein the monochromator divides an enlongated sheet of light which is provided by the optic fibers, into its component wave length with the light-sensing arrays being positioned at two spaced locations along the wave length for picking up light of two separate wave lengths.

A still further object of the invention is to provide a light-receiving end on a line which is parallel to the axis of the burner to measure light coming from the flame at ever-increasing distances from the burner.

Another object of the invention is to provide the light-receiving ends on a line which is perpendicular to the axis for taking measurements across the width of the flame.

A still further object of the invention is to provide a method of analyzing the quality of a flame utilizing the fiber optic array and the processing equipment connected to the array.

A still further object of the invention is to provide a flame quality analyzer which is simple in design, rugged in construction and economical to manufacture.

For an understanding of the principles of the invention, reference is made to the following description of typical embodiments thereof as illustrated in the accompanying drawings.

DESCRIPTION OF THE PREFERRED EMBODIMENTS

The flame quality analyzer (FQA) of the invention begins with a recognition of the complexity of the combustion process and, accordingly, does not attempt to characterize the burner performance with a single number. Rather, it provides the operator with plots showing the distribution in the flame of two parameters known to be of fundamental importance, e.g., the temperature and the particle loading.

Figure 1:
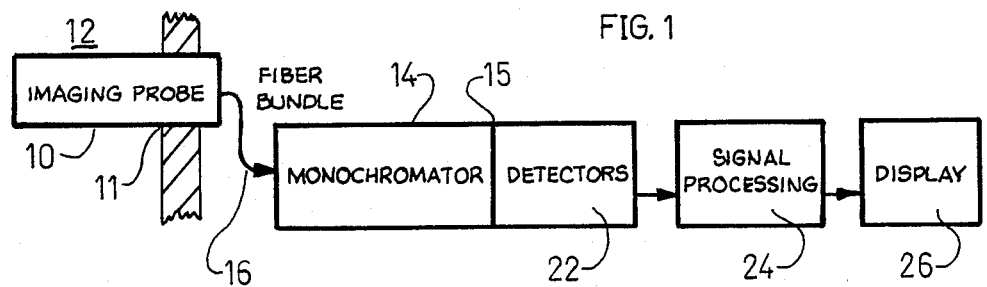
FIG. 1 is a block diagram showing the flame quality analyzer of the invention.
Figure 2:
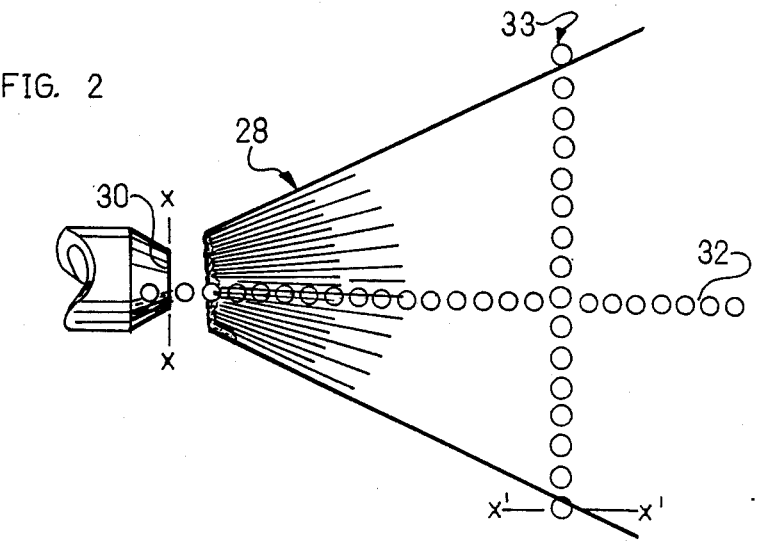
FIG. 2 is a side elevational view of a burner with burner flame in conjunction with two different fiber optic arrays which can be used in accordance with the invention.
Figure 3:
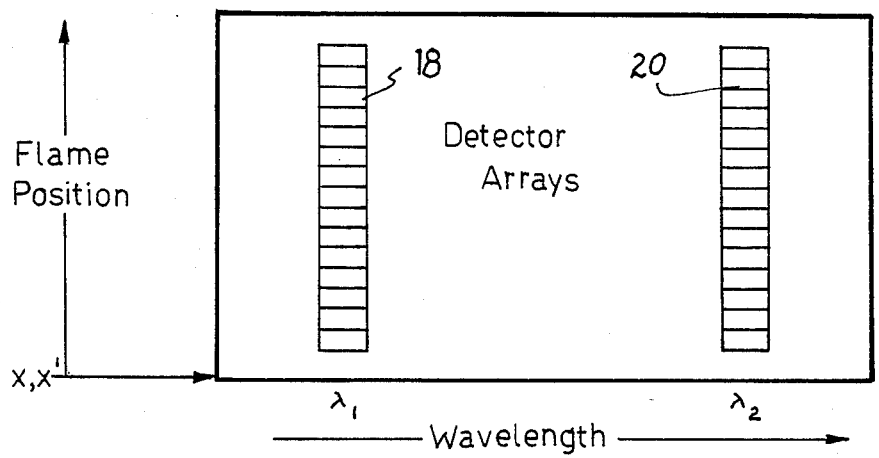
FIG. 3 is a simplified elevational view of the light-detector arrays used in conjunction with the fiber optic array.

FIG. 1 is a block diagram of the FQA. An imaging probe 10 that is inserted through the windbox of a furnace 12, focuses an image onto a fiber optic array (FIG. 2) that conveys the light over a fiber bundle 16 to a monochromator 14. The monochromator separates the light into different wavelength components. Two self-scanned photodiode arrays 18 and 20 in FIG. 3, are located at the output of the monochromator in a detector 22 so that one measures the light intensity at one wavelength $\lambda 1$, while the other measures it at another wavelength $\lambda 2$. As explained later, the scanning photodiodes measure irradiance at these wavelengths as a function of position across the flame image. The signals from the two detector arrays are manipulated by signal processing electronics 24 to determine the temperature and particle loading profiles which are displayed in graphical form to the operator on a display 26. Probe 10 is of the air purged type to avoid contamination of the optics.

Figure 4:
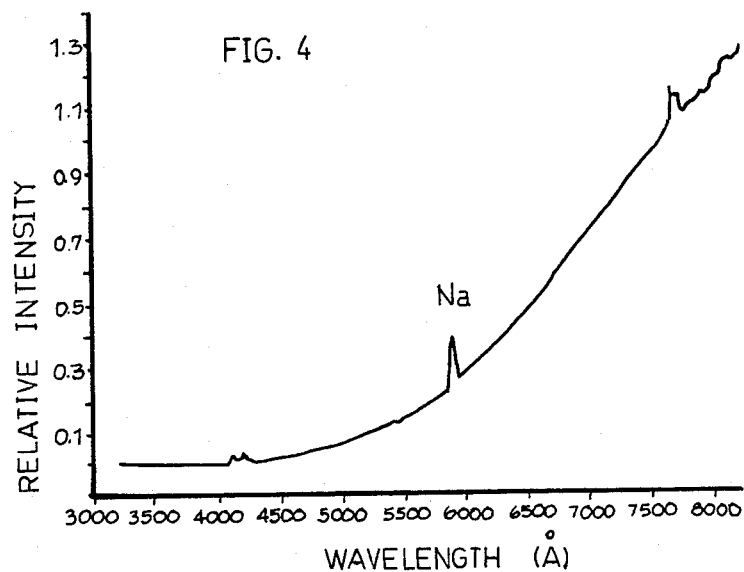
FIG. 4 is a graph showing the relative intensity of light from a burner flame plotted against the wave length distribution of the light.

The spectral irradiance of a typical coal flame is shown in FIG. 4. Over most of the wavelength range, the irradiance is due to emission from hot solid particles. However, the peaks around 5892 Å and 7676 Å are due to emission from atomic sodium (Na) and atomic potassium (K), respectively.

The spectral irradiance at wavelength $\lambda$ can be written $$I(\lambda) = \epsilon f W(\lambda, T) \quad (1)$$

where:
 $\epsilon$ is the emissivity of the radiators,
 f is the fraction of the emitted light that is transmitted through the unburned particles that lie between the radiators and the detector, and
 $W(\lambda, T)$ is Planck's blackbody function.

For temperatures of interest, W can be approximated by the expression:

$$W(\lambda, T) = C_1 \lambda^{-5} e^{-C_2/\lambda T} \quad (2)$$

where:
 $C_1 = 3.7415 \times 10^{-16}$ watt $m^2$
 $C_2 = 1.43879 \times 10^{-2} m \cdot K$ For a cloud of hot coal particles, the effective emissivity will depend on the size, number density, and composition of the coal. Furthermore, it will be wavelength dependent function. However, for the sodium and potassium line radiation, the emissivity is equal to one. One can, therefore, express the irradiance at the sodium and potassium lines as:

$$I_{Na} = f W(\lambda_{Na}, T) \quad (3)$$

$$I_K = f W(\lambda_K, T). \quad (4)$$

Because the unburned particles that prevent a fraction of the light from reaching the detector are large compared to the wavelength of interest, the factor f is the same at both $\lambda_{Na}$ and $\lambda_K$. Therefore, if one measures $I_{Na}$ and $I_K$, Equations (3) and (4) can be solved for the only two unknowns, T and f.

Figure 6:
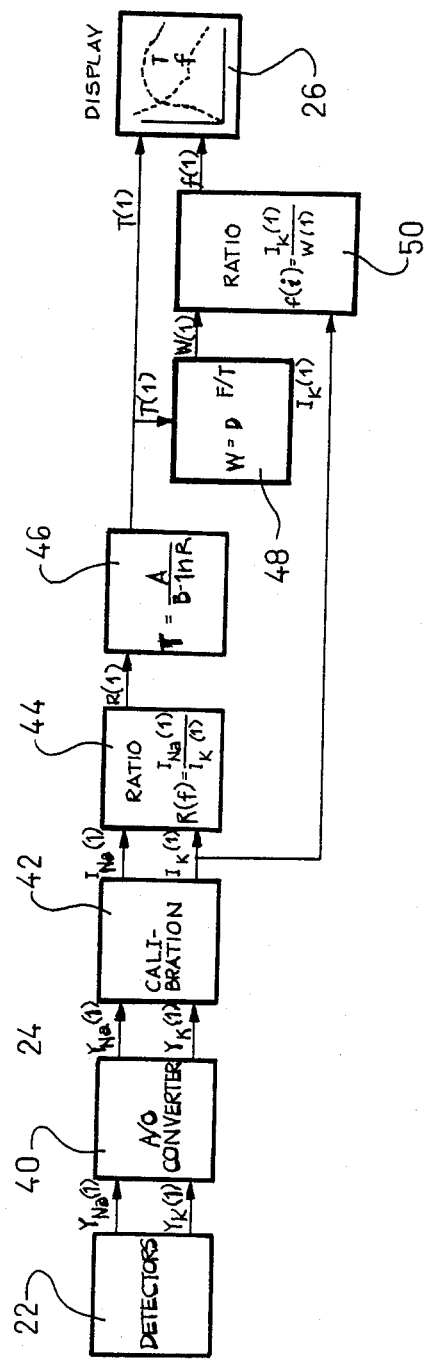
FIG. 6 is a block diagram showing the workings of a signal processing unit for calculating the quality factors from the detected light values.

In the FQA $I_{Na}$ and $I_K$ are measured as a function of position in the flame and present the operator with visual plots of both T and f as a function of position (see FIG. 6).

The factor f depends on the total number of unburned particles along the line of sight and on their size and optical properties. Since f is directly related to what an observer perceives as the flame brightness, it can simply be called an index of particle loading and presented to the operator. The temperature and index profiles of a "good" flame can be established once the equipment is set up and the values are correlated with other measures of performance, such as visual observation through a side door.

Turning now again to the equipment necessary to implement the measurements described above, the major components are the probe, monochromator, detectors, signal processor, and display shown in FIG. 1.

The probe 10 consists of an imaging objective assembly and an array of optical fibers enclosed in an air-purged housing. The probe is mounted in an observation port 11 on the burner front. The tip of the probe is inserted far enough into the windbox 12 so that it can provide a wide-angle image of the flame 28 that includes an edge X—X of the coal pipe 30. A linear array of optical fibers 32 is placed in the image plane and oriented along the burner axis, as shown in FIG. 2. Each fiber of the array will, therefore, collect light from a specific location in the flame from the edge X—X outward. Since the ordering of the fibers is maintained from one end to the other, the distribution of brightness along the flame can be seen at the output end. Instead of visually observing this distribution, however, the fiber array is aligned with the input slit of the monochromator 14.

The "white-light" brightness distribution at the input is spread by the monochromator into its various color (wavelength) components. Therefore, at the monochromator's output plane 15 there is a two-dimensional brightness distribution with wavelength along the horizontal axis and flame position along the vertical.

The two self-scanned photodiode arrays 18, 20 are located at the monochromator output plane 15. These are commercially available linear arrays of between 64 and 2048 independent photodetectors. The arrays are aligned vertically, so that each detector receives light from a specific location in the flame. In the horizontal plane one array is located to receive light from the sodium line radiation, while the other array receives the potassium line radiation. For this case, therefore, $\lambda_1 = \lambda_{Na}$ and $\lambda_2 = \lambda_K$.

Figure 5:
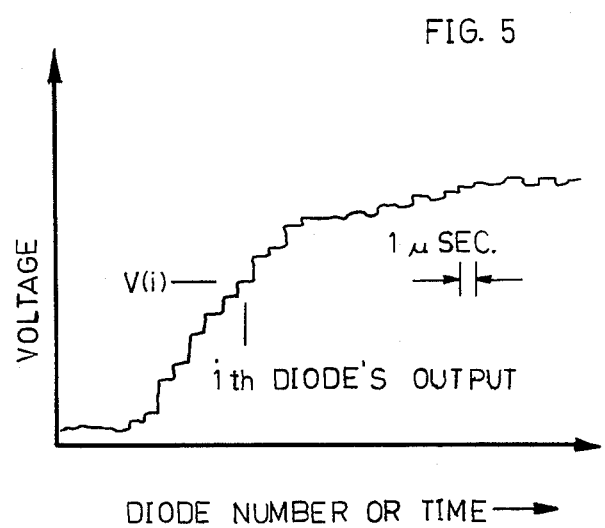
FIG. 5 is a graph showing the voltage from a light-sensor in the form of a diode plotted against the individual diode of the array being measured or against time.

In operation, all of the photodiodes of an array receive light simultaneously. Periodically, upon command, the diodes are read-out serially giving a video type output, as shown, in FIG. 5. Each step of the histogram corresponds to the output from a specific diode in the array, while the voltage at that step is a measure of the integrated light flux on that diode since the previous readout scan. It can be seen, then, that the output of our arrays will give the sodium and potassium line intensity distributions along the flame.

These signals provide input to a small dedicated computer system in unit 24 that calculates the particle loading index and temperature for each of the N positions in the flame, N being the number of photodiodes in each array. The calculated T and f distributions are then displayed for the operator on a CRT or other suitable readout device at display 26.

The basic step in the signal processing routine are shown in FIG. 6. One beings with the diode array outputs, $V_{Na}(i)$ and $V_K(i)$. Here, the (i) indicates the output from the ith diode in the array. This nomenclature is introduced to indicate that both $V_{Na}$ and $V_K$ really consist of a periodically updated string of N independent voltage measurements.

The first step in the signal processing is to convert the analog signal from the diode arrays 18, 20 in detector 22 to digital form in an analog-to-digital converter 40. Next, each of the V signals is multiplied by a predetermined constant to calibrate the signals in terms of irradiance. This is done in calibration unit 42. The irradiance signals are next rationed in unit 44, on an element-by-element basis to produce the signal $R(i) = I_{Na}(i)/I_K(i)$.

This ratio signal is then converted to temperature through the relationship:

$$T(i) = \frac{C_2(1/\lambda_{Na} - 1/\lambda_K)}{5\ln \lambda_K/\lambda_{Na} - \ln R(i)} \quad (5)$$

which comes from solving Equations (3) and (4) for T. This takes place in calculating unit 46.

The T(i) values are then sent to the display 26, but also used to determine the function $W_K(i)$ from the expression, $$W_K(i) = C_1 \lambda_K^{-5} e^{-C_2/\lambda K T(i)} \quad (6)$$

This is done in calculating unit 48.

Having these values of $W_K(i)$, finally determines and sends to the display the value of $$f(i) = \frac{I_K(i)}{W_K(i)} \quad (7)$$

This calculation which takes place in unit 50, completes the signal processing.

The foregoing signal processing can also take place for an alternate arrangement of the optic fibers which is also shown at FIG. 2. According to this arrangement, the light-receiving ends of the fibers lie in an array 33 extending in a line perpendicular to the axis of the burner 30. The detector arrays of FIG. 3 then are aligned with respect to the width direction of the flame beginning at the line x′—x′, and continuing upwardly as shown in FIG. 2. This optic array 33 can be used separately from the optic array 32 or in addition to that optic array fo analyzing the width of the flame and also its characteristics across the width. As noted above, the detecting and processing steps are identical to those utilized with the optic array 32 so that further details will not be provided.

While specific embodiments of the invention have been shown and described in detail to illustrate the application of the principles of the invention, it will be understood that the invention may be embodied otherwise without departing from such principles.

What is claimed is:

1. A flame quality analyzer for analyzing the quality of a flame from a burner, comprising:
   a fiber optic array including a plurality of optic fibers each having a light-receiving end for facing the flame, and lying on a line in a selected direction with respect to an axis of the burner wherein said fiber optic array transmits light from the flame corresponding to said selected direction; and
   light-processing means connected to said fiber optic array for processing light from the flame comprising a monochromator for receiving the light from the flame and spreading the light from the flame to its component wave length, said light processing means further including a detector having a first and a second detector array of light sensors extending in a line for receiving a portion of the light from the flame at two discrete wave lengths to generate two sets of signals, each set of signals including an output of each light sensor.

2. An analyzer according to claim 1, wherein said selected direction is parallel to the burner axis.

3. An analyzer according to claim 1, wherein said selected direction is perpendicular to the burner axis.

4. An analyzer according to claim 1, wherein the light from the flame has sodium and potassium wave length peaks, said first detector array positioned at said sodium peak and said second detector array positioned at said potassium peak on the light from the flame spread by said monochromator.

5. An analyzer according to claim 1, including signal processing means connected to said light-processing means for receiving the two sets of signals and for calculating from the two sets of signals a temperature and a particle index profile for the flame along said selected direction.

6. An analyzer according to claim 5, wherein the light from the flame spread by said monochromator has a sodium wave length peak and a potassium wave length peak, said first detector array positioned to receive said sodium wave length peak and said second detector array positioned to receive said potassium wave length peak, said signal processing means calculating the temperature profile according to the equation:

$$T(i) = \frac{C_2(1/\lambda_{Na} - 1/\lambda_K)}{5\ln \lambda_K/\lambda_{Na} - \ln R(i)}$$

wherein
   $C_2$ equals $1.43879 \times 10^{-2}$ m·K
   $\lambda_{Na}$ is the wave length of the sodium peak,
   $\lambda_K$ is the wave length of the potassium peak,
   R is equal to the ratio of irradiance for the sodium and potassium peaks, and i refers to the ith set of light sensors in the first and second detector array.

7. An analyzer according to claim 6, wherein said signal processing means includes a display for plotting the value T(i) for each light sensor set.

8. An analyzer according to claim 7, wherein said signal processing means includes means for calculating the particle index profile in said selected direction according to the relationship:

$$f(i) = \frac{I_K(i)}{W_K(i)}$$

wherein $$W_K(i) = C_1 \lambda_K^{-53 - C_w/\lambda K T(i)}$$

and wherein
   $C_1$ equals $3.7415 \times 10^{-16}$ watt m$^2$
   and $I_K$ is equal to the irradiance of the potassium peak.

9. A method of analyzing the quality of a flame from a burner having a burner axis comprising:
   positioning a fiber optic array which includes a plurality of optic fibers each having a light-receiving end to face the flame, each light-receiving end lying on a line in a selected direction with respect to an axis of the burner;

conveying a sheet of light from the flame over the fiber optic array to a monochromator;

spreading the sheet of light in the monochromator into its component wave lengths;

detecting the sheet of light at two separate and discrete wave lengths in the light from the flame to generate two sets of signals; and processing two sets of signals to calculate at least one property of the flame.

10. A method according to claim 9, including displaying the two sets of signals in the form of a graphic representation across the selected direction for the quality of the flame.

11. A method according to claim 10, including detecting the wave length of light at a sodium peak and at a potassium peak of the spread sheet of light.

12. A method according to claim 11, including calculating a temperature distribution along the selected direction using the relationship:

$$T(i) = \frac{C_2(1/\lambda_{Na} - 1/\lambda_K)}{5\ln \lambda_K/\lambda_{Na} - \ln R(i)}$$

wherein $\lambda C_2$ equals $1.43879 \times 10^{-2}$ m·K $\lambda_{Na}$ is the wave length of the sodium peak, $\lambda_K$ is the wave length of the potassium peak, R is equal to the ratio of irradiance for the sodium and potassium peaks, and i refers to the ith set of light sensors in th first and second detector array.

13. A method according to claim 12, including determining the particle index distribution across the selected direction according to the relationship:

$$f(i) = \frac{I_K(i)}{W_K(i)}$$

wherein $$W_K(i) = C_1 \lambda_K^{-5} e^{-C_w/\lambda_K T(i)}$$

and wherein $C_1$ equals $3.74515 \times 10^{-16}$ watt m$^2$ and $I_K$ is equal to the irradiance of the potassium peak.

14. A method according to claim 13, including providing the light-receiving ends to lie in a selected direction parallel to the axis of the burner.

15. A method according to claim 13, including providing the light-receiving ends to lie in a selected direction perpendicular to the axis of the burner.

* * * * *

UNITED STATES PATENT AND TRADEMARK OFFICE
CERTIFICATE OF CORRECTION

PATENT NO. : 4,644,173

DATED : Feb. 17, 1987

INVENTOR(S) : Jeffers

It is certified that error appears in the above-identified patent and that said Letters Patent is hereby corrected as shown below:

Col. 2, line 13, delete "enlongated" and insert therefor --elongated--.

Col. 4, line 65, delete "beings" and insert therefor --begins--.

Col. 5, line 44, delete "fo" and insert therefor --for--.

Col. 5, line 45, delete "the" and insert therefor --that--. (1ST occurrence)

Col. 6, line 56, change "3" in the equation to --e--.

Signed and Sealed this

Fourteenth Day of August, 1990

Attest:

HARRY F. MANBECK, JR.

*Attesting Officer*  *Commissioner of Patents and Trademarks*